United States Patent
Brunel

(10) Patent No.: US 9,506,386 B2
(45) Date of Patent: Nov. 29, 2016

(54) INJECTION DEVICE FOR A REDUCING AGENT AND CORRESPONDING EXHAUST LINE

(71) Applicant: Faurecia Systemes D'Echappement, Nanterre (FR)

(72) Inventor: Jean-Paul Brunel, Meslieres (FR)

(73) Assignee: Faurecia Systemes D'Echappement, Nanterre (FR)

( * ) Notice: Subject to any disclaimer, the term of this patent is extended or adjusted under 35 U.S.C. 154(b) by 0 days.

(21) Appl. No.: 14/557,492

(22) Filed: Dec. 2, 2014

(65) Prior Publication Data
US 2015/0152766 A1 Jun. 4, 2015

(51) Int. Cl.
| | |
|---|---|
| *F01N 3/00* | (2006.01) |
| *F01N 3/20* | (2006.01) |
| *B01J 19/24* | (2006.01) |
| *F01N 3/28* | (2006.01) |

(52) U.S. Cl.
CPC .............. *F01N 3/2013* (2013.01); *B01J 19/24* (2013.01); *F01N 3/2066* (2013.01); *F01N 3/2892* (2013.01); *B01J 2219/00135* (2013.01); *B01J 2219/24* (2013.01); *F01N 2610/02* (2013.01); *F01N 2610/102* (2013.01); *F01N 2610/107* (2013.01); *F01N 2610/1453* (2013.01); *Y02T 10/24* (2013.01)

(58) Field of Classification Search
USPC .................. 60/286, 295, 300, 301, 303, 324
See application file for complete search history.

(56) References Cited

U.S. PATENT DOCUMENTS

| | | | | |
|---|---|---|---|---|
| 6,601,385 B2 * | 8/2003 | Verdegan | ........... | B01D 53/8631 60/274 |
| 7,448,206 B2 * | 11/2008 | Meingast | ............ | B01F 3/04049 239/433 |
| 7,509,799 B2 * | 3/2009 | Amou | ................ | B01D 53/9431 60/286 |
| 8,082,732 B2 * | 12/2011 | Nefischer | ............... | B01D 53/90 60/286 |
| 8,615,984 B2 * | 12/2013 | Kornherr | ............... | B01D 53/90 60/286 |
| 8,935,918 B2 * | 1/2015 | Vosz | ..................... | F01N 3/2892 60/295 |

FOREIGN PATENT DOCUMENTS

| | | |
|---|---|---|
| EP | 1936137 A1 | 6/2008 |
| EP | 2573351 A1 | 3/2013 |
| WO | 2006003868 A1 | 1/2006 |
| WO | 2013087566 A1 | 6/2013 |

OTHER PUBLICATIONS

French Search Report dated Apr. 30, 2014.

* cited by examiner

*Primary Examiner* — Binh Q Tran
(74) *Attorney, Agent, or Firm* — Carlson, Gaskey & Olds, PC

(57) ABSTRACT

An injection device comprises a volume, an injection device to inject a jet of liquid reagent into the volume, at least one first impactor positioned in the volume, and a first heating device to heat the first impactor. The first heating device comprises a first heating member having a device having a thermally conductive zone in contact with the first impactor or defining the first impactor. A resistive heating element is housed in the device and arranged to heat the thermally conductive zone.

26 Claims, 7 Drawing Sheets

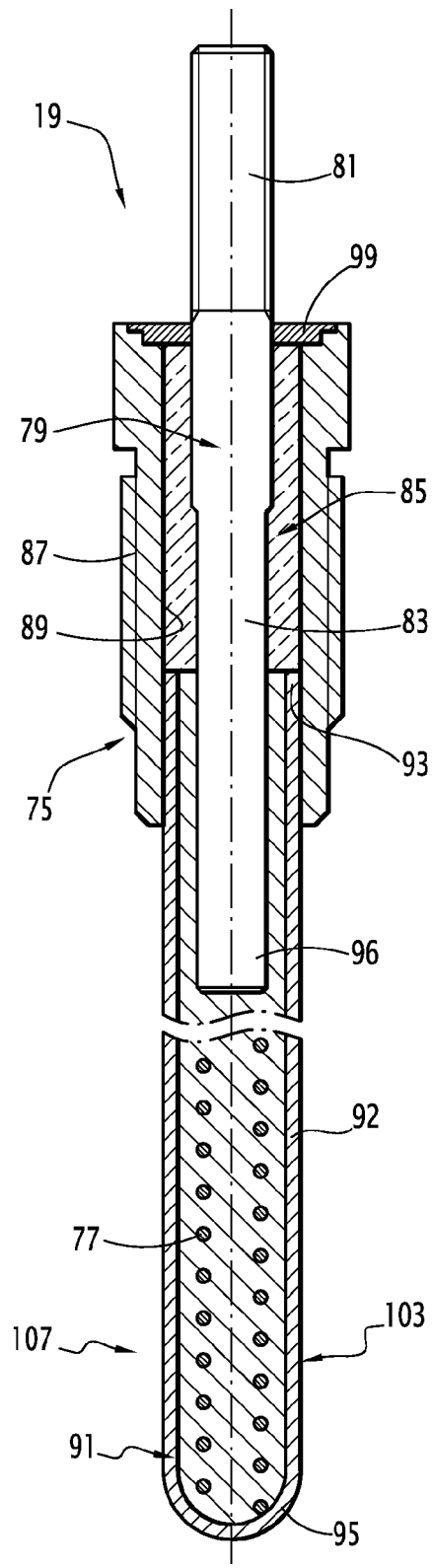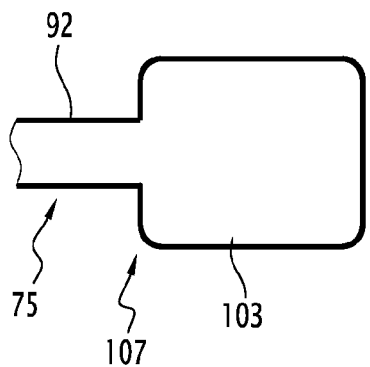
FIG.8
FIG.7

INJECTION DEVICE FOR A REDUCING AGENT AND CORRESPONDING EXHAUST LINE

RELATED APPLICATION

This application claims priority to French application no. 1362032, filed Dec. 3, 2013.

TECHNICAL FIELD

The invention generally relates to injection devices for injecting a reducing agent in an exhaust line, the reducing agent typically being ammonia. More specifically, according to a first aspect, the invention relates to a device for injecting a reducing agent in an exhaust line, the device being of the type that includes a volume having an exhaust gas inlet and an exhaust gas outlet, a device to inject a jet of liquid reagent into the volume, the liquid reagent comprising a reducing agent or a precursor for such a reducing agent, at least one first impactor positioned in the volume to intercept the jet of liquid reagent, and a first heating device for heating the first impactor.

BACKGROUND

Many exhaust lines are now equipped with NOx reducing devices of the SCR (Selective Catalytic Reduction) type. These devices are provided to convert NOx into gaseous N2. The reducing agent used is typically gaseous ammonia.

The injection device according to the invention is provided to be installed on such exhaust lines. The liquid reagent is then either a liquid ammonia solution, or a solution containing an ammonia precursor, such as urea.

When the exhaust gases are at a temperature below approximately 180° C., the transformation of the urea into NH3 is very difficult to do, and leads to deposits that may obstruct the exhaust line over time. These deposits may cause NH3 emission peaks during the temperature increase of the exhaust gases, if that increase leads to resorption of the deposits.

However, the SCR catalyst begins to be effective at lower temperatures, approximately 120° C. It also has an NH3 storage capacity, which makes it possible to manage the transitional phases where the demand for NH3 increases abruptly. The impossibility of injecting ammonia or urea solution at low temperatures makes it impossible to take advantage of that storage capacity. Thus, in the case of operation with a high load following a period with no possible injection, it is temporarily not possible to reduce the NOx.

In the future, approval cycles for exhaust line pollution control will incorporate colder and more realistic operating conditions for traveling at low temperatures, in particular in an urban cycle.

Furthermore, it is desirable to broaden the usage conditions for the NOx reducing system, and to that end it must be possible to inject liquid reagent containing the reducing agent, or the precursor for said reducing agent, at lower temperatures.

This means heating the injection zone of the liquid reagent to accelerate the evaporation of the reducing agent and the conversion of the precursor of said reducing agent if necessary.

Several technical solutions may be considered to heat the injection zone.

A first possibility consists of offsetting the combustion of the fuel, by performing a post-injection to heat the exhaust gases leaving the engine. This first solution causes excess fuel consumption, and potentially deterioration of the motor oil by diluting unburned products.

A second solution consists of electrically heating the exhaust gases. However, such heating requires significant electricity, which is detrimental to the fuel consumption of the vehicle. Furthermore, it is very difficult to install the electrical heating members due to the very small packaging space available to install the reducing agent injection device onboard the vehicle.

The best solution consists of heating only the impactor(s). These impactors are designed to receive the jet of liquid reagent, and to break it down into finer droplets, which favors their vaporization.

In fact, the majority of the jet of liquid reagent is sprayed on a relatively limited surface, namely the impactors, and the heating of that surface favors the vaporization and production of gaseous ammonia, even at a low temperature of the exhaust gases. The surface to be heated is relatively small, such that the electricity consumption and the size of the heating members are limited.

The heating device must make it possible to bring the impactor(s) to a high temperature, quickly. It must also be able to withstand the thermal and chemical stresses related to installation inside an exhaust line. The heating device must in particular be able to withstand exhaust gas temperatures of up to 700° C., and exposure to aggressive chemical elements like those resulting from the transformation of the precursor for the reducing agent, for example the isocyanic acid coming from the decomposition of the urea.

U.S. Pat. No. 6,969,492 describes one example of heating the impactors to favor evaporation of the liquid reagent. However, this document does not precisely describe how to heat the impactor(s) in practice.

SUMMARY

In this context, the invention aims to propose an injection device equipped with a device for heating the impactor(s) that meets the above constraints.

To that end, the invention relates to an injection device of the aforementioned type, wherein the first heating device comprises a first heating member having device situated at least partially in the volume and having a thermally conductive zone in contact with the first impactor or defining the first impactor, and a resistive heating element housed in the device and arranged to heat the thermally conductive zone.

The device protects the heating element from the exhaust gases. The resistive heating element can therefore be installed extremely close to the impactor. This makes it possible to heat the impactor quickly. The power of the heating element and the materials of the heating member are chosen to withstand very high temperatures, for example up to more than 800° C., preferably up to more than 1000° C.

The transmission of the heat from the heating element to the device, and optionally from the device to the first impactor, is done by conduction, which allows a rapid temperature increase that makes it possible to obtain very high temperatures.

The injection device may also have one or more of the features below, considered individually or according to all technically possible combinations:

the first heating member is connected to the first impactor by a first clamp elastically biasing the device against the first impactor;

the first clamp is cut in the first impactor or attached on the first impactor;

the device has a generally elongated shape along a longitudinal central axis, the device comprising a tubular side wall surrounding the longitudinal central axis and an end wall closing one end of the tubular side wall, the thermally conductive zone being a zone of the tubular side wall;

the volume is delimited by an inlet bottom in which the exhaust gas inlet is arranged, an outlet bottom in which the exhaust gas outlet is arranged and placed across from the inlet bottom, and a peripheral wall connecting the inlet bottom to the outlet bottom, the device extending away from the inlet bottom and the outlet bottom;

the device comprises a second impactor positioned in the volume, so as to intercept the jet of liquid reagent, and a second heating device of the second impactor, said second heating device comprising a second heating member having:

a device situated at least partially in the volume and having a thermally conductive zone in contact with the second impactor or defining the second impactor; and a second resistive heating device housed in the device and arranged to heat the thermally conductive zone;

the jet is sprayed in a main direction, the devices of the first and second heating members forming respective orthogonal projections in a plane perpendicular to the main direction that do not overlap;

the first and second impactors are each delimited by an upper edge and a lower edge opposite each other, the injection device further comprising an upper plate connecting the upper edges of the first and second impactors to each other, and/or a lower plate connecting the lower edges of the first and second impactors to each other;

the first and second impactors and the lower and upper plates define a housing that is only in contact with a wall of the volume by a plurality of raised portions arranged on the lower plate; and/or the first heating member is a glow plug.

According to a second aspect, the invention pertains to a vehicle exhaust line comprising an injection device having the above features.

Other features and advantages of the invention will emerge from the detailed description thereof provided below, for information and non-limitingly, in reference to the appended figures, in which:

BRIEF DESCRIPTION OF THE DRAWINGS

FIG. 7 is a cross-sectional view of a heating member of the device of FIG. 1;

FIG. 8 is a simplified side view of an end of the heating member according to one alternative embodiment of the invention.

DETAILED DESCRIPTION

The injection device 1 is shown in FIGS. 1 to 5. It is intended to inject a reducing agent into an exhaust line 3 of the type shown in FIG. 6. The exhaust line 3 comprises a catalyst 5 of the SCR type, in order to convert the NOx contained in the exhaust gases into gaseous N2. A reducing agent allowing such conversion is typically gaseous ammonia $NH_3$.

The device 1 is therefore provided to inject a solution either of ammonia or of an ammonia precursor, for example a urea solution, in the exhaust line 3.

After injection, the ammonia or ammonia precursor solution evaporates under the effect of the heat directly ceded by the exhaust gases, or under the effect of the heat provided by the surfaces impacted by the droplets forming the injection jet.

The gaseous ammonia forms either directly in the case of the ammonia solution, or after decomposition (thermal hydrolysis) in the case of urea.

Alternatively, the injection device can be provided to inject another ammonia precursor, or to inject a reducing agent different from ammonia or a precursor of a reducing agent different from ammonia (hydrogen, hydrocarbons).

Figure 1:
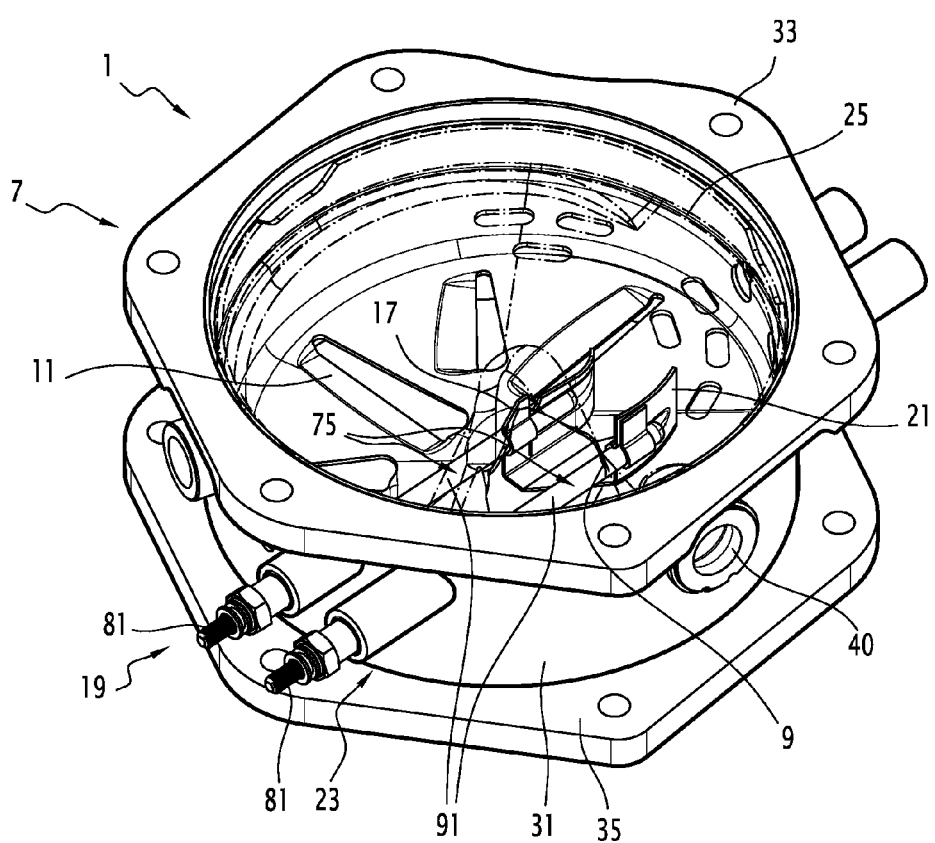
FIG. 1 is a perspective view of an injection device according to the invention, an inlet cup being shown transparently to see inner members of the device.

As shown in FIG. 1, the injection device 1 includes a volume 7 having at least one exhaust gas inlet 9 and at least one exhaust gas outlet 11, an injection device 13 that injects a jet 15 of liquid reagent (FIG. 2), at least one first impactor 17 positioned in the volume 7 to intercept the jet 15 of liquid reagent. A first device 19 heats the first impactor 17.

In the illustrated example, the injection device 1 further comprises a second impactor 21 positioned in the volume 7 to intercept the jet 15 of liquid reagent, and a second heating device 23 preheating the second impactor 21. Alternatively, the device 1 could comprise only one impactor and one heating device.

Figure 2:
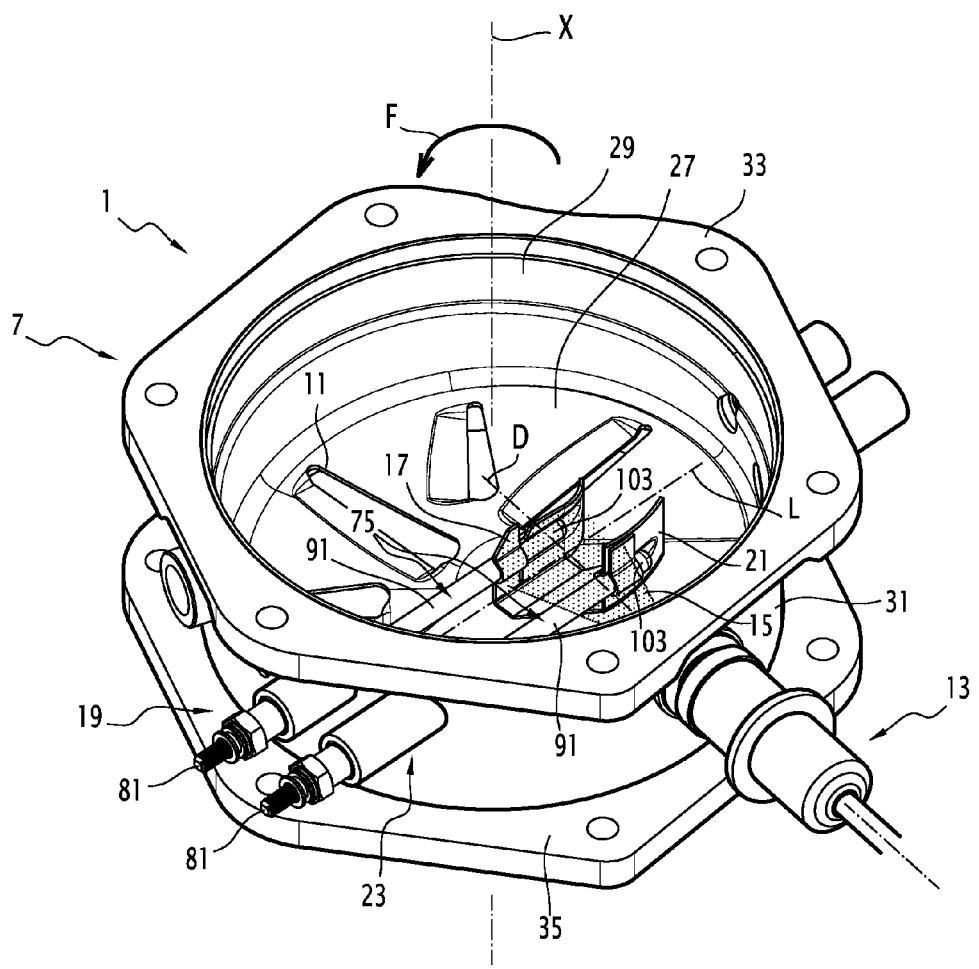
FIG. 2 is a view similar to that of FIG. 1, without the inlet cup.

As shown in FIGS. 1 and 2, the volume 7 is delimited by an inlet bottom 25 in which the exhaust gas inlet 9 is arranged, an outlet bottom 27 in which the exhaust gas outlet 11 is arranged, and a tubular side wall 29 connecting the inlet bottom 25 to the outlet bottom 27.

More specifically, in the example shown in FIGS. 1 and 2, the outlet bottom 27 and the tubular side wall 29 form a cup. The tubular side wall 29 is substantially cylindrical. The outlet bottom 27 corresponds to the bottom of the cup and is secured with one end of the tubular side wall 29. It has a generally helical shape, and winds around an axis X corresponding to the central axis of the tubular side wall 29. The outlet 11 is made up of a plurality of orifices arranged in the outlet bottom 27.

The inlet bottom of 25 is attached to the other end of the tubular side wall 29 and is placed across from the outlet bottom 27. It is in the shape of a helical ramp. The main inlet 9 is completed by a plurality of orifices arranged in the inlet bottom 25.

The volume 7 also comprises a cylindrical body 31 surrounding the tubular side wall 29.

Inlet and outlet flanges 33 and 35 are rigidly fastened to the body 31. These flanges make it possible to connect the volume 7 to an upstream segment 36 and a downstream segment 38, respectively, of the exhaust line (see FIG. 6). The inlet 9 and outlet 11 are in fluid communication with the segments 36 and 38, respectively.

The volume 7 is therefore arranged as described in WO 2012/080585. However, other arrangements can be considered.

The injection device 13 is of a known type and will not be described here in more detail. It is mounted in a ring 40 (FIG. 1) secured to the body 31. The jet 15 forms a cone from the injection device 13, around an injection direction D embodied in FIG. 2.

The injection direction D is substantially perpendicular to the axis X. In the illustrated example, it is substantially radial relative to the axis X. Alternatively, the injection direction D is oriented from the injection device 13 toward the center of the volume 7, without being strictly radial.

Alternatively, the injection direction D is substantially tangential to a circle perpendicular to the axis X and centered on the axis X.

The injection device 13 is designed to inject a jet of droplets of liquid reagent.

The first 17 and second 21 impactors are small metal plates. They are, for example, made from stainless steel and are 0.5 to 2 mm thick.

Considered in the injection direction D, the second impactor 21 is situated relatively closer to the injection device 13 than the first impactor 17.

Figure 3:
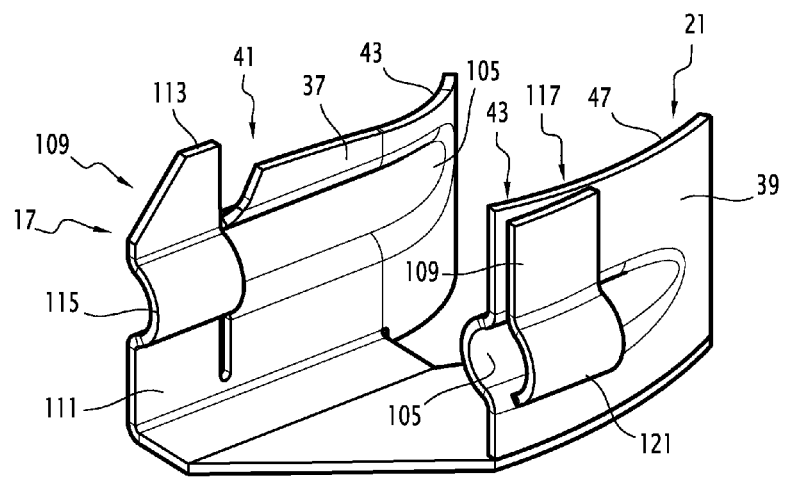
FIG. 3 is an enlarged perspective view of impactors of the device of FIGS. 1 and 2.

As shown in FIG. 3, the first 17 and second 21 impactors each comprise a planar part 41, 43 laterally extended by a slightly convex part 45, 47 toward the injection device 13. The first 17 and second 21 impactors each have a large working face referenced 37, 39, respectively, turned toward the injection device 13, and provided to receive the jet 15 of liquid reagent. The first 17 and second 21 impactors also each have another large face, not referenced, turned toward the central zone of the volume 7.

The first 17 and second 21 impactors are offset relative to each other in a direction L, embodied in FIG. 2. The direction L is substantially perpendicular to the injection direction D and the axis X.

Thus, as illustrated in FIG. 2, the first 17 and second 17 impactors each intercept part of the jet 15 of liquid reagent.

The first 17 and second 21 impactors have complex curved shapes, but the planar parts 41, 43 generally extend in a respective plane substantially parallel to the direction L and substantially perpendicular to the injection direction D. The convex parts 45, 47 submerge the planar parts 41, 43 in the direction L, and curve from the planar parts 41, 43 from a side opposite the injection device 13.

In the illustrated example, the first 19 and second 23 heating devices are identical. Only the first heating device 19 will be described in detail below.

In the illustrated example, the first heating device 19 comprises a first heating member. This member is a glow plug. The first heating member is for example of the type described in FR 2,928,688.

As shown by FIG. 7, the glow plug comprises a device 75, a resistive heating element 77 placed in the device 75, an electrical connector 79 with a connection 81 to the outside of the device 75, and a conductive segment 83 electrically connecting the connection 81 to the heating element 77. A sealing and electrical insulation component 85 is positioned between the device 75 and the conductive segment 83.

The heating element 77 is a heating electric resistance.

The device 75 comprises a glow plug body 87 provided with a cylindrical inner channel 89 for passage of the electrical connector 79, and a sheath 91 housing the heating element 77.

The sheath 91 forms a cylindrical hollow finger, elongated along a longitudinal axis. The sheath 91 comprises a tubular side wall 92 having an open end 93 engaged in the channel 89 and an end closed by an end wall 95. The conductive segment 83 is engaged in the channel 89 by a central part. An end part 96 of the conductive segment 83, opposite the connection 81, is engaged in the sheath 91 by the open end 93. The heating element 77 is electrically connected to the end part 96 of the conductive segment 83.

The outer diameter of the open end 93 of the sheath 91 is substantially equal to the inner diameter of the channel 89.

The sheath 91 is filled with manganese (MgO) to keep the end part 96 and the resistive heating element 77 in position. It makes it possible to conduct the heat from the resistance to the sheath 91 by conduction while ensuring electrical insulation of the resistance with the sheath 91 (connected to the ground).

The resistive heating element 77 is a wire wound in a spiral around a longitudinal axis extending along part of the cover opposite the glow plug body 87 up to the end wall 95.

The resistive heating element 77 typically comprises a regulating filament and a heating filament. The heating filament is positioned in the active heating zone.

The first heating device 19 comprises an electric generator (not shown) to which the connection 81 is electrically connected.

The sealing and electrical insulation component 85, for example, comprises a glass stopper filling the annular space between the conductive segment 83 and the glow plug body 87. The stopper extends axially from the open end 93 of the sheath 91 to the end of the inner channel 89 situated opposite the sheath 91.

The glow plug body 87 is fastened to the body 31 of the volume 7 by a ring (not shown).

The active part of the first heating device 19, corresponding to the end part of the sheath 91 including the resistive heating element 77, is positioned in the volume 7.

Thus, the device 75, as shown in FIG. 2, is partially situated inside the volume 7. More specifically, the sheath 91 is positioned on its largest length inside the volume 7.

The device 75 has a first thermally conductive zone 103 in contact with the first impactor 17. The first thermally conductive zone 103 is a zone of the tubular side wall 92 of the sheath. It is situated near the closed end of the sheath.

Putting the first heating device 19 in contact with the first impactor 17 via the tubular side wall 92, and not the end wall 95, makes it possible to increase the contact surface.

To still further increase the contact surface, the first impactor 17 comprises a hollow cavity 105 (FIG. 3) that is substantially semi-cylindrical. The hollow cavity 105 is concave at the large working face 37. It extends longitudinally. A free end 107 of the first heating device 19 is engaged in the cavity 105, and is pressed against the bottom of the cavity 105.

The first heating device 19 is connected to the first impactor 17 by a first clamp 109 elastically biasing the device 75 against the first impactor 17. More specifically, the first heating device 19 is directly connected to the first impactor 17 only by the first clamp 109.

As shown in FIG. 3, in one example embodiment, the first clamp 109 is cut in the first impactor 17. The first clamp 109 is elongated along the axis X. It is secured to the rest of the impactor 17 by a first axial end 111, with its opposite axial end 113 being free. Between ends 111 and 113, the clamp 109 comprises a hollow raised portion 115, designed to adapt circumferentially around the device 75. The cavity 105 and the hollow raised portion 115 have opposite concave directions. Thus, the device 75 is pressed on one side against the bottom of the cavity 105 and on an opposite side against the bottom of the hollow raised portion 115. It is therefore elastically clamped between the cavity 105 and the hollow raised portion 115, without being rigidly fastened to the impactor 17 or to the clamp 109.

This fastening mode is particularly advantageous. Indeed, when the glow plug is brought to a high temperature, its device 75, and more particularly its tubular side wall, undergo a significant longitudinal expansion. This longitudinal expansion is not prevented by the clamp 109. Likewise, the first device 75, and in particular the tubular side wall 92, undergo a circumferential expansion at a high temperature that is not prevented by the clamp 109.

The second heating device 23 comprises a second heating member that may be connected to the second impactor 21 by a clamp of the same type as the first clamp 109.

In an alternative embodiment shown in FIG. 3, however, the second heating member is connected to the second impactor 21 by second clamp 117 that is a different type of clamp. The second clamp 117 is not cut into the second impactor 21, but is attached on the second impactor 21.

The second clamp 117 is a small plate that is elongated parallel to the axis X. It comprises a first substantially planar part 119 axially extended by a second concave part 121. The first substantially planar part 119 is rigidly fastened on the large working face 39 of the second impactor 21. The second part 121 has a concave side turned toward the hollow cavity 105 of the second impactor 21. The second part 121 is placed across from the hollow cavity 105.

Thus, the end segment 107 of the sheath 91 of the second heating device 23 is clamped between the bottom of the hollow cavity 105 and the concave part 121 of the second clamp 117. In this alternative embodiment, a same segment of the tubular side wall 92 is pressed on one side against the bottom of the cavity 105 and on the other side against the concave part 121.

On the contrary, in the first alternative embodiment of the clamp 109, there are two different segments of the tubular side wall 92, one of which is pressed against the hollow raised portion 115 and the other against the cavity 105.

It will be noted that the hollow cavities 105 are arranged in the planar parts 41, 43 of the two impactors.

The configuration shown in FIG. 3 is particularly advantageous. In this configuration, the heating member of the first impactor 17 is connected thereto by a clamp 109 cut into the first impactor 17, while the heating member of the second impactor 21 is pressed against the second impactor 21 by a clamp 117 attached on the second impactor 21. This makes it possible to limit the bulk of the second impactor parallel 21 to the direction L, and to have the second impactor 21 not constitute a screen for the jet 15 of liquid reagent relative to the first impactor 17. However, it may be considered that the two impactors are equipped with cut clamps or, on the contrary, equipped with attached clamps, or that the first impactor is equipped with an attached clamp and the second with a cut clamp.

In the example embodiment of FIG. 2, the two heating devices 19 and 23 extend parallel to the direction L, and are positioned on the same side of the first 17 and second 21 impactors. In an alternative embodiment that is not shown, the first 19 and second 23 heating devices may be positioned on two opposite sides of the impactors.

Figure 9:
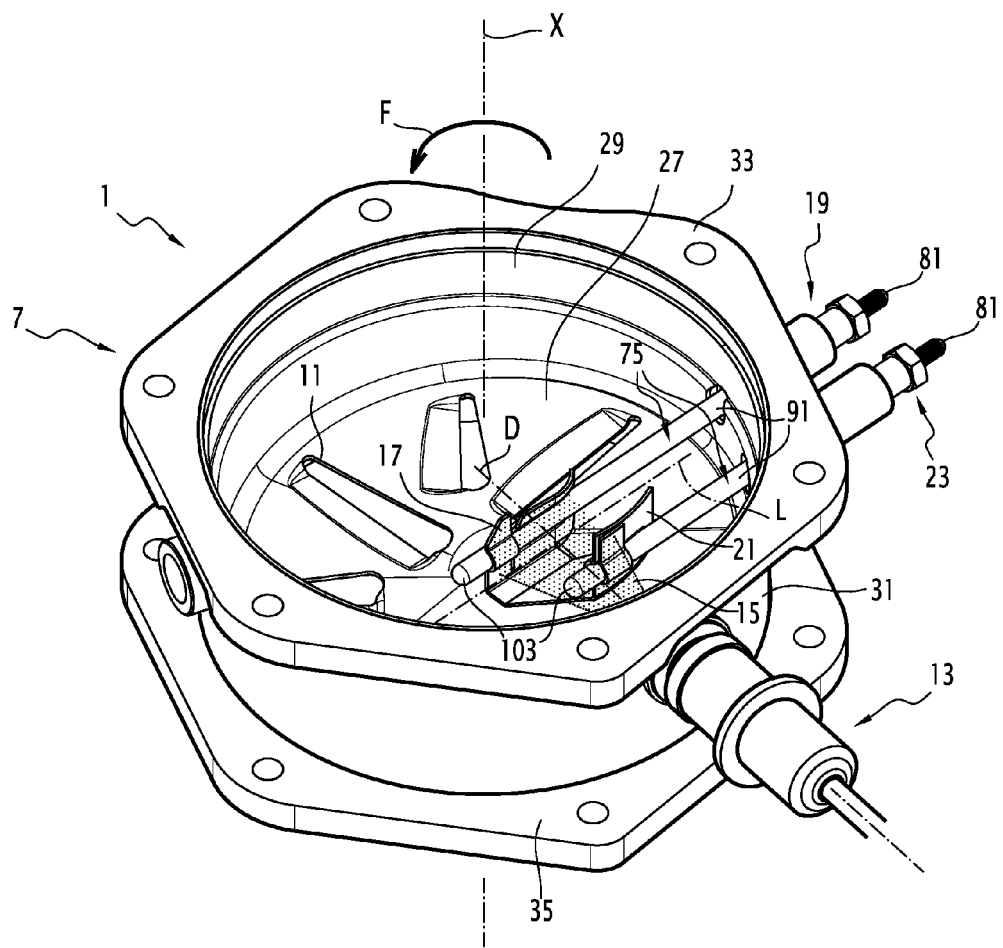
FIGS. 9 and 10 illustrate alternative embodiments of the invention.
Figure 10:
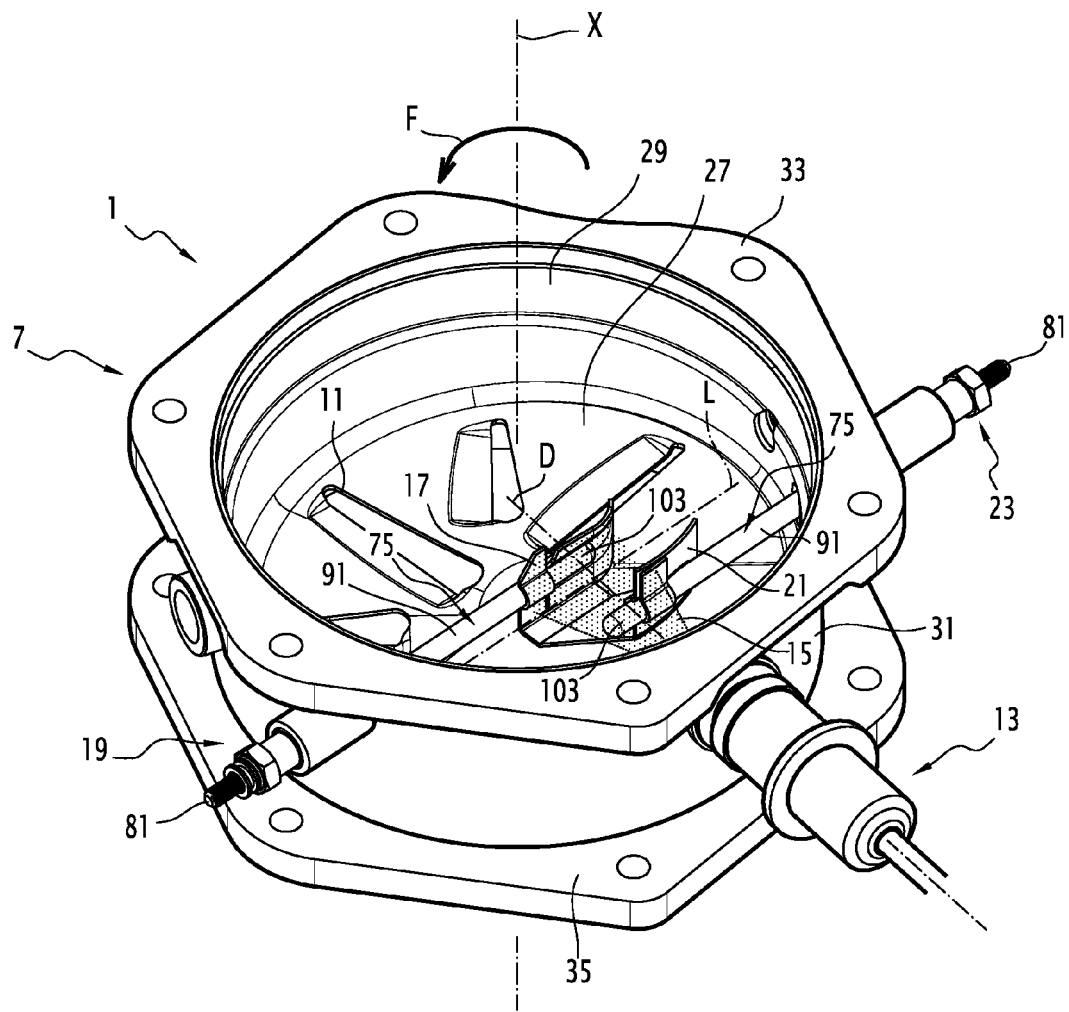

In FIG. 2, the arrow F shows the flow direction of the exhaust gases in the volume 7. These exhaust gases have a substantially helical movement around the axis X. In the example embodiment of FIG. 2, the heating devices are therefore situated on an upstream side relative to the impactors. Upstream and downstream are understood here relative to the flow direction of the exhaust gases. In alternatives shown in FIGS. 9 and 10, the first heating device and/or the second heating device are placed on a downstream side of the impactors.

Figure 4:
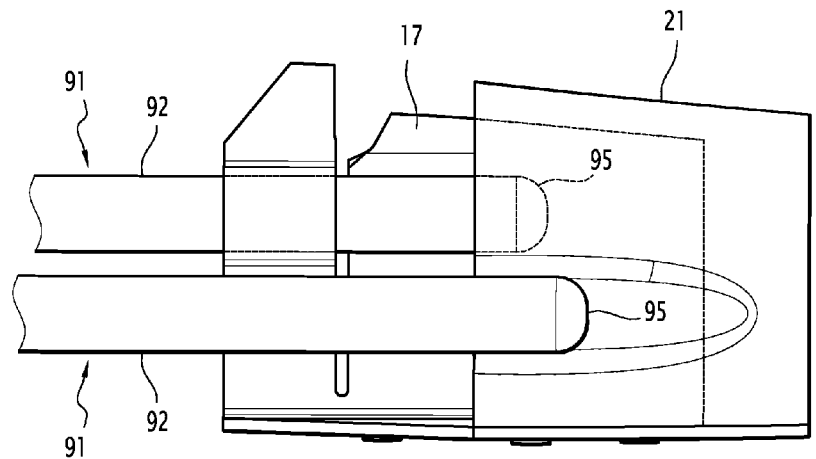
FIG. 4 is a simplified diagrammatic illustration of two impactors and two heating members in a plane perpendicular to an injection direction.

So that the second heating device does not conceal the first heating device with respect to the jet 15 of liquid reagent, the first and second heating devices are arranged such that they form respective orthogonal projections in a plane P perpendicular to the injection direction D that do not overlap. This situation is illustrated in FIG. 4. This figure diagrammatically shows the first 17 and second 21 impactors, in orthogonal projection in the plane P perpendicular to the injection direction D. The orthogonal projections of the sheaths 91 of the heating devices are also shown. It is clearly shown that the projection of the sheaths 91 of the first heating device is situated above the projection of the sheath 91 of the second heating device. These projections extend parallel to each other, and are positioned one above the other. They never overlap.

Alternatively, it is possible to arrange the second device above the first device.

The plane P is for example the plane perpendicular to the injection direction D containing the axes X.

The operation of the injection device will now be described.

The exhaust gases penetrate the volume 7 via the inlet 9, and flow in a helical manner around the axis X inside that volume 7. They leave through the outlet(s) 11. The injection device 13 sprays the jet 15 of liquid reagent toward the impactors 17 and 21. As shown in FIG. 2, the jet 15 strikes either the first impactor or the end part 107 of the first heating device 19, or the second impactor 21 or the end part 107 of the second heating device 23. Under the effect of the impact, droplets of liquid reagent explode into finer droplets. These finer droplets are driven by the exhaust gases and evaporate under the effect of the heat ceded by the exhaust gases. If the liquid reagent contains urea, that urea is converted into gaseous ammonia.

When the temperature of the exhaust gases is below a predetermined value, a control computer causes heating of the first 19 and second 23 heating devices. The resistive heating elements 77 give off heat, that heat being transferred by conduction to the devices 75, then passing by conduction through thermally conductive zones 103 up to the first 17 and second 21 impactors. The heat is next diffused by conduction over the entire surface of the first 17 and second 21 impactors.

In one alternative embodiment, the computer can adjust the electricity powering each of the heating devices 19, 23 based on the temperature of the exhaust gases.

The fact that the drops of liquid reagent strike an impactor at a high temperature accelerates the evaporation of the liquid reagent.

Figure 5:
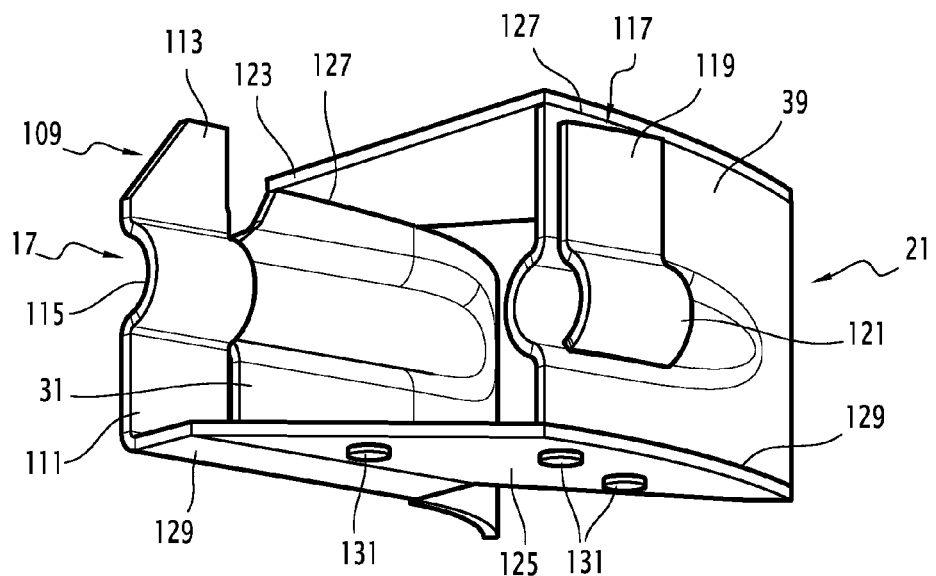
FIG. 5 is a perspective view similar to that of FIG. 3, for an alternative embodiment of the invention in which the two impactors are connected to each other by upper and lower plates.
Figure 6:
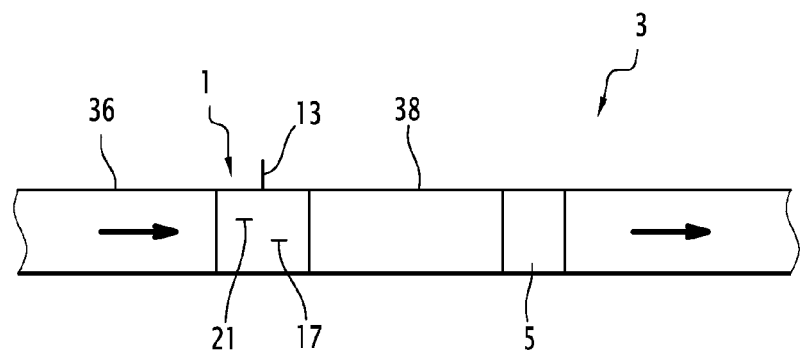
FIG. 6 is a partial illustration of an exhaust line including an injection device according to the invention.

An alternative embodiment of the invention is illustrated in FIG. 5.

In this alternative embodiment, the injection device comprises an upper plate 123 and a lower plate 125 that connect upper edges 127 of the first 17 and second 21 impactors and lower edges 129 of the first 17 and second 21 impactors to each other, respectively. The upper edges 127 of the first and second impactors are turned toward the bottom 25. The lower edges 129 are turned toward the outlet bottom 27. The upper 123 and lower 125 plates, with the first 17 and second 21 impactors, therefore together form a housing. The plates 123, 125 are made from a metal, for example stainless steel, that conducts heat well, and are heated by conduction by the first and second heating devices, via the impactors.

The upper 123 and lower 125 plates make it possible to further improve the evaporation of the liquid reagent. In fact, part of the jet of liquid reagent directly impacts the upper 123 and lower 126 plates. Furthermore, some droplets of liquid reagent, after having exploded in contact with the first impactor 17, in turn impact the upper 123 and lower 125 plates.

Advantageously, the lower plate 125 can be used to thermally uncouple the impactors 17, 21 from the outlet bottom 27.

To that end, the lower plate 125 bears a plurality of raised portions 131, protruding toward the outlet bottom 27. The lower plate 125 rests on the outlet bottom 27 only via the raised portions 131. It supports the first 17 and second 21 impactors, which have no direct contact with the outlet bottom 27. Heat loss is thus limited in the outlet bottom 27, as is thermal inertia.

In an alternative embodiment shown in FIG. 8, the device 75 of the first heating device and/or the second heating device respectively defines the first 17 impactors and/or the second 21 impactors. The end 107 of the device 75 is in the form of a plate, substantially having the dimensions of the first 17 and/or second 21 impactors described above.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An injection device to inject a reducing agent in an exhaust line, the device comprising:
    a volume having an exhaust gas inlet and an exhaust gas outlet;
    a device to inject a jet of liquid reagent into the volume, the liquid reagent comprising a reducing agent or a precursor for such a reducing agent, and being injected into the volume according to an injection direction;
    at least one first impactor positioned in the volume to intersect the injection direction and to intercept the jet of liquid reagent;
    a first heating device of the first impactor, the first impactor being thermally conductive, wherein the first heating device comprises a first heating member having a casing situated at least partially in the volume and having a thermally conductive zone in contact with the first impactor; and
    a resistive heating element housed in the casing and arranged to heat the thermally conductive zone.

2. The device according to claim 1, wherein the first heating member is connected to the first impactor by a first clamp elastically biasing the casing against the first impactor.

3. The device according to claim 2, wherein the first clamp is cut in the first impactor.

4. The device according to claim 1, wherein the casing has a generally elongated shape along a longitudinal central axis, the casing comprising a tubular side wall surrounding the longitudinal central axis and an end wall closing one end of the tubular side wall, the thermally conductive zone being a zone of the tubular side wall.

5. The device according to claim 1, wherein the volume is delimited by an inlet bottom in which the exhaust gas inlet is arranged, an outlet bottom in which the exhaust gas outlet is arranged and placed across from the inlet bottom, and a peripheral wall connecting the inlet bottom to the outlet bottom, the casing extending away from the inlet bottom and the outlet bottom.

6. The device according to claim 1, including a second impactor positioned in the volume to intersect the injection direction and to intercept the jet of liquid reagent, a second heating device of the second impactor, the second impactor being thermally conductive, wherein the second heating device comprises a second heating member having a casing situated at least partially in the volume and having a thermally conductive zone in contact with the second impactor, and a resistive heating element housed in the casing and arranged to heat the thermally conductive zone.

7. The device according to claim 6, wherein the jet is sprayed in a main direction, the casings of the first and second heating members forming respective orthogonal projections in a plane perpendicular to the main direction that do not overlap.

8. The device according to claim 6, wherein the first and second impactors are each delimited by an upper edge and a lower edge opposite each other, and further comprising an upper plate connecting the upper edges of the first and second impactors to each other.

9. The device according to claim 6, wherein the first and second impactors are each delimited by an upper edge and a lower edge opposite each other, and further comprising an upper plate connecting the upper edges of the first and second impactors to each other, and a lower plate connecting the lower edges of the first and second impactors to each other.

10. The device according to claim 1, wherein the first heating member is a glow plug.

11. A vehicle exhaust line comprising:
    an upstream exhaust segment;
    a downstream exhaust segment; and
    an injection device positioned between the upstream and downstream exhaust segments, the injection device comprising a volume having an exhaust gas inlet and an exhaust gas outlet, a device to inject a jet of liquid reagent into the volume, the liquid reagent comprising a reducing agent or a precursor for such a reducing agent, at least one first impactor positioned in the volume to intercept the jet of liquid reagent, a first heating device of the first impactor, wherein the first heating device comprises a first heating member having a casing situated at least partially in the volume and having a thermally conductive zone in contact with the first impactor, and a resistive heating element housed in the casing and arranged to heat the thermally conductive zone.

12. The device according to claim 2, wherein the first clamp is attached on the first impactor.

13. The device according to claim 1, wherein the first impactor is located in front of the device to inject a jet of liquid along the injection direction.

14. The device according to claim 4, wherein the end of the tubular side wall and the end wall are entirely arranged in the volume.

15. The device according to claim 1, including a second impactor positioned in the volume to intersect the injection direction and to intercept the jet of liquid reagent, a second heating device of the second impactor, the second impactor being thermally conductive, wherein the second heating device comprises a second heating member having
- a casing situated at least partially in the volume and having
- a thermally conductive zone defining the second impactor, and
- a resistive heating element housed in the casing and arranged to heat the thermally conductive zone.

16. The device according to claim 6, wherein the second impactor is located in front of the device to inject a jet of liquid along the injection direction.

17. The device according to claim 15, wherein the second impactor is located in front of the device to inject a jet of liquid along the injection direction.

18. The device according to claim 15, wherein the jet is sprayed in a main direction, the casings of the first and second heating members forming respective orthogonal projections in a plane perpendicular to the main direction that do not overlap.

19. The device according to claim 6, wherein the first and second impactors are each delimited by an upper edge and a lower edge opposite each other, and further comprising a lower plate connecting the lower edges of the first and second impactors to each other.

20. The device according to claim 9, wherein the first and second impactors and the lower and upper plates define a housing that is only in contact with a wall of the volume by a plurality of raised portions arranged on the lower plate.

21. The device according to claim 15, wherein the first and second impactors are each delimited by an upper edge and a lower edge opposite each other, and further comprising an upper plate connecting the upper edges of the first and second impactors to each other.

22. The device according to claim 15, wherein the first and second impactors are each delimited by an upper edge and a lower edge opposite each other, and further comprising a lower plate connecting the lower edges of the first and second impactors to each other.

23. The device according to claim 15, wherein the first and second impactors are each delimited by an upper edge and a lower edge opposite each other, and further comprising an upper plate connecting the upper edges of the first and second impactors to each other, and a lower plate connecting the lower edges of the first and second impactors to each other.

24. The device according to claim 23, wherein the first and second impactors and the lower and upper plates define a housing that is only in contact with a wall of the volume by a plurality of raised portions arranged on the lower plate.

25. An injection device to inject a reducing agent in an exhaust line, the device comprising:
- a volume having an exhaust gas inlet and an exhaust gas outlet;
- a device to inject a jet of liquid reagent into the volume, the liquid reagent comprising a reducing agent or a precursor for such a reducing agent and being injected into the volume according to an injection direction;
- at least one first impactor positioned in the volume to intersect the injection direction and to intercept the jet of liquid reagent;
- a first heating device of the first impactor, the first impactor being thermally conductive wherein the first heating device comprises a first heating member having
- a casing situated at least partially in the volume and having
- a thermally conductive zone defining the first impactor; and
- a resistive heating element housed in the casing and arranged to heat the thermally conductive zone.

26. A vehicle exhaust line comprising:
an upstream exhaust segment;
a downstream exhaust segment; and
an injection device positioned between the upstream and downstream exhaust segments, the injection device comprising a volume having an exhaust gas inlet and an exhaust gas outlet, a device to inject a jet of liquid reagent into the volume, the liquid reagent comprising a reducing agent or a precursor for such a reducing agent, at least one first impactor positioned in the volume to intercept the jet of liquid reagent, a first heating device of the first impactor, wherein the first heating device comprises a first heating member having a casing situated at least partially in the volume and having a thermally conductive zone defining the first impactor, and a resistive heating element housed in the casing and arranged to heat the thermally conductive zone.

* * * * *